UNITED STATES PATENT OFFICE.

WILLIAM ELLIOTT STEDMAN, OF HAYWARDS HEATH, ENGLAND.

AIR AND GERM PROOF COVER FOR SEALING BOTTLES.

1,299,389.

No Drawing.

Specification of Letters Patent.

Patented Apr. 1, 1919.

Application filed February 4, 1919. Serial No. 275,017.

*To all whom it may concern:*

Be it known that I, WILLIAM ELLIOTT STEDMAN, a subject of the King of Great Britain and Ireland, residing at Boltro House, Boltro Road, Haywards Heath, in the county of Sussex, England, have invented new and useful Improvements in Air and Germ Proof Covers for Sealing Bottles Containing Fruit and other Foodstuffs, of which the following is a specification.

The invention consists of improvements in manufacturing parchment covers for sealing bottles containing fruit and other foodstuffs by treating them with hot solutions made by dissolving in boiling water a mixture of 66% pulverized gums of vegetable origin such as gum arabic combined with 33.5% of albuminoid matter such as gelatin and 5% of vegetable coloring thereby rendering them air proof and germ proof as follows:—

1. A piece of vegetable parchment or greaseproof paper of suitable quality and size is laid on a flat surface and brushed over with the hot solution.

2. Another similar piece of parchment or greaseproof paper is then taken, placed on the first, and the two thicknesses are then pressed together in such a way as to remove all air bubbles.

3. The second piece is then also brushed over with the hot solution and the double thickness of treated parchment is placed on the bottle or jar of previously sterilized fruit or food and tied down.

The cover so prepared and applied renders the bottles or jars absolutely air proof, maintaining the contents in a condition of complete sterility indefinitely when stored under reasonable conditions, thus enabling fruit and other food stuffs to be kept perfectly good for a year or longer, so rendering costly special jars or bottles entirely unnecessary for domestic and ordinary use, thereby securing great economy.

What I claim is:—

An air and germ proof cover for sealing bottles and the like consisting of two layers of grease proof paper secured together by a binder therebetween comprising 66% gums of vegetable origin and 33.5% of albuminoid matter, the said binder being of such density as to exclude air and the said joined papers being externally coated with the said binder composition.

In testimony whereof I sign my name to this specification.

W. ELLIOTT STEDMAN.

Copies of this patent may be obtained for five cents each, by addressing the "Commissioner of Patents, Washington, D. C."